United States Patent [19]

Javan

[11] 4,329,664

[45] May 11, 1982

[54] GENERATION OF STABLE FREQUENCY RADIATION AT AN OPTICAL FREQUENCY

[76] Inventor: Ali Javan, 12 Hawthorne St., Cambridge, Mass. 02138

[21] Appl. No.: 178,090

[22] Filed: Aug. 14, 1980

Related U.S. Application Data

[63] Continuation-in-part of Ser. No. 157,708, Jun. 9, 1980, abandoned, which is a continuation-in-part of Ser. No. 939,993, Sep. 6, 1978, abandoned.

[51] Int. Cl.³ .......................... H01S 3/10; G01C 3/08
[52] U.S. Cl. ....................................... 332/7.51; 356/5; 372/18; 372/32
[58] Field of Search .................. 332/7.51; 331/94.5 S, 331/94.5 ML, 94.5 N; 372/18, 20, 32; 307/424–429; 356/5, 28.5

[56] References Cited

U.S. PATENT DOCUMENTS

| | | | |
|---|---|---|---|
| 3,420,600 | 1/1969 | Meuers et al. | 455/611 |
| 3,437,955 | 4/1969 | Enloe et al. | 331/94.5 S |
| 3,877,813 | 4/1975 | Hayes et al. | 356/5 |
| 3,956,626 | 5/1976 | Ross | 455/611 |
| 3,984,675 | 10/1976 | Corcoran et al. | 307/424 |
| 4,096,448 | 6/1978 | Hayes | 331/94.5 ML |
| 4,163,954 | 8/1979 | Hayes | 356/5 |
| 4,215,936 | 8/1980 | Winocur | 455/615 |
| 4,240,746 | 12/1980 | Courtenay et al. | 331/94.5 S |

FOREIGN PATENT DOCUMENTS 6607388 11/1966 Netherlands ...................... 332/7.51

Primary Examiner—Nelson Moskowitz

[57] ABSTRACT

Stable-frequency optical radiation is generated by use of an electro-optical modulator to produce from radiation of a power laser that has inherent frequency fluctuations, an optical side band of the radiation that has the stable frequency. A modulating signal is applied to the modulator, the signal based upon a difference-frequency signal that represents the difference in frequencies between the output of the power laser and an optical signal obtained from a highly stable reference source. The reference radiation shown is the direct output radiation of a stable reference laser. In one embodiment the pulses of a high power $CO_2$ TEA laser operating on a single mode are synchronized with a pulsed broad band amplifier which amplifies the difference-frequency signal to produce the modulating signal, and an optical delay in the power laser output path, preceding the modulator, corrects for the delay provided by the amplifier and other sources of delay. The invention provides chirp free pulsed lasers, and lasers having stable frequency from pulse to pulse. Improved doppler lidar and other lidar systems are provided that utilize the stabilized output as the probing radiation.

9 Claims, 4 Drawing Figures

FIG 1
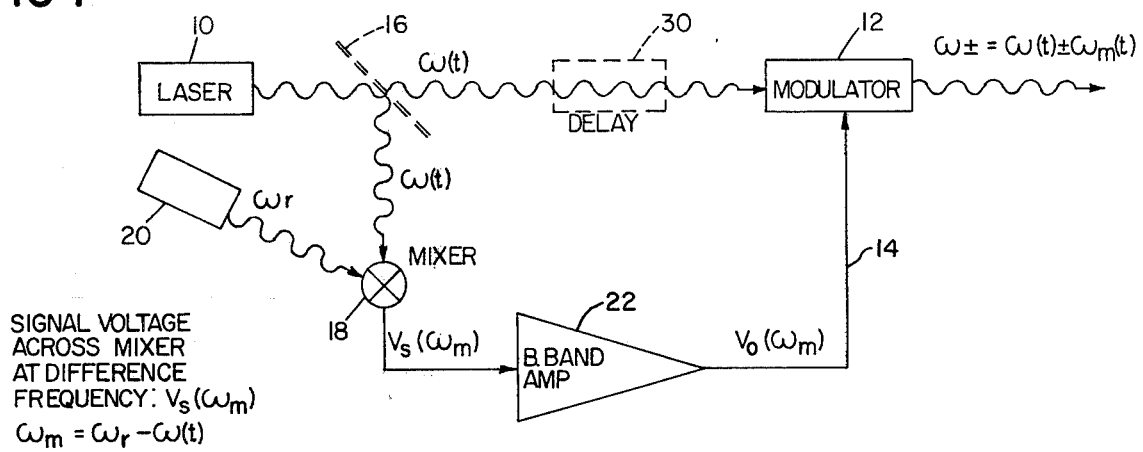
FIG 2
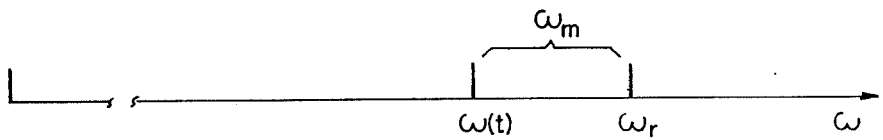
FIG 3
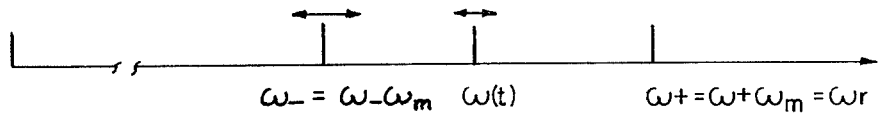
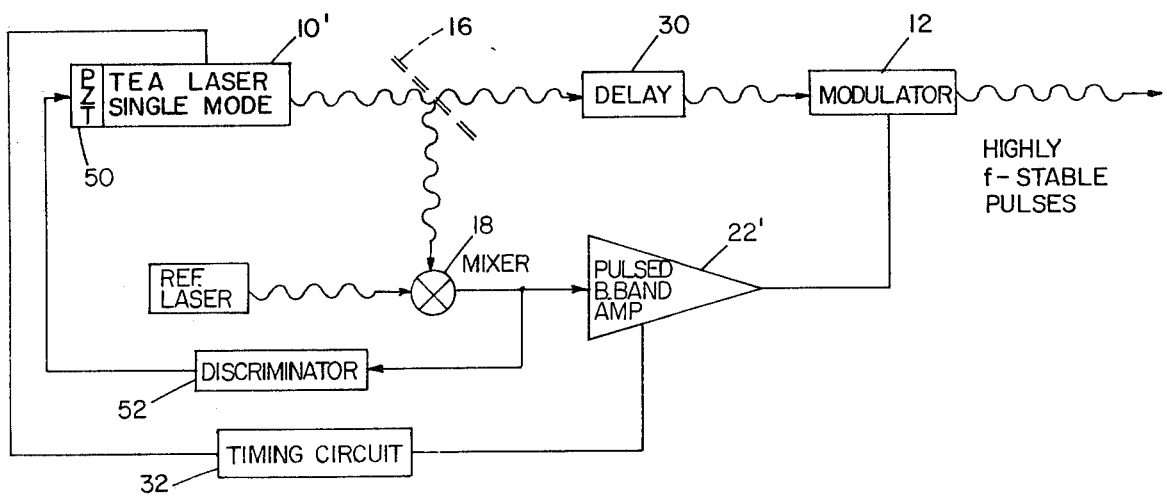
FIG 4

GENERATION OF STABLE FREQUENCY RADIATION AT AN OPTICAL FREQUENCY

BACKGROUND OF INVENTION

This application is a continuation-in-part of our application Ser. No. 157,708, filed June 9, 1980, now abandoned which was a continuation-in-part of my application Ser. No. 939,993, filed Sept. 6, 1978, now abandoned.

This invention relates to the generation of stable-frequency radiation at an optical frequency and in particular to generation of such radiation in pulse form at high energy levels with stable frequency in successive pulses and during each pulse. The invention has application for instance to laser doppler radar, to detectors for cloud movement or clear air turbulence via Doppler wind velocity measurements and in other demanding applications.

It is well-known that a laser frequency can be stabilized against the fixed frequency of an external reference radiation by means of an automatic frequency control in which the control signal is introduced via the laser frequency tuning mechanism. To give an example, consider a single mode laser of moderate or high power oscillating at a frequency $\omega$. As a free running laser (without an automatic frequency control), the laser frequency, $\omega$, is generally subject to a sizable fluctuation. Consider now a stable reference laser whose output frequency $\omega_r$ lies close to $\omega$. In practice, the reference laser is in general a low power CW laser with a rugged mechanical structure and good thermal isolation, offering a high degree of frequency stability in its free-running mode of operation. The frequency of this reference laser can be further stabilized in several ways. These include frequency stabilization against a narrow Doppler free resonance as in Javan-Freed U.S. Pat. No. 3,686,585. In this way, the reference laser frequency, $\omega_r$, will have a fluctuation considerably less than the fluctuation of the first laser frequency, $\omega$, in its free-running mode of operation. To reduce the frequency fluctuation of the first laser, the output of this first laser is mixed in a high speed frequency mixing element with the output of the reference laser. The signal voltage at the difference frequency $\omega - \omega_r$, generated across the frequency mixing element, is used to extract an error voltage for automatic tracking of the laser frequency $\omega$ against $\omega_r$. Assume, e.g., $\omega - \omega_r$ to lie in the rf region. The error signal can be generated by feeding the rf difference frequency signal voltage to a discriminator at a fixed center frequency, $\omega_o$, with $\omega_o \simeq \omega - \omega_r$. In this way a DC voltage is generated at the output of the discriminator which is nearly proportional to $(\omega - \omega_r) - \omega_o$. This DC voltage is then fed at a proper phase to drive the laser frequency tuning mechanism. Usually this frequency tuning mechanism consists of the well-known PZT controlling the first laser's resonator length.

There are certain important lasers in which the fluctuations of the laser frequency $\omega$ occur at a rapid rate, requiring a high speed correction of the laser frequency. The frequency stabilization method described above cannot be applied if this rapid fluctuation takes place at rates considerably higher than the response limit of the laser frequency tuning mechanism. For instance, consider an e-beam or photopreionized sustained pulsed TEA $CO_2$ laser at several MW peak intensity and a several microsecond pulse duration. Single mode operation in the line center region can be achieved by means of a well known method in which a low pressure longitudinally excited $CO_2$ laser amplifier discharge tube is placed in the TEA laser resonator. In this case, pulse-to-pulse reproducible single mode laser oscillation occurs on the laser mode lying nearest to the line center. The laser frequency, however, fluctuates from pulse to pulse by several MHz because of the laser resonator fluctuations causing shifts in resonator mode frequency. Such frequency fluctuations will also exist if an external low pressure CW $CO_2$ laser is used to "injection lock" the high intensity pulsed $CO_2$ laser at near line center.

In addition for the above and other types of pulse lasers, due to small changes in refractive index of the laser medium during each pulse, frequency chirping will occur that has not been possible to adequately correct.

A number of important applications, such as Doppler wind velocity measurements and other similar LIDAR applications, require an intense pulsed transmitter laser oscillating at a highly stable and pulse-to-pulse reproducible frequency. The automatic frequency control of the type described above can be used to achieve a long-term frequency stability averaged over many pulses. However, the method cannot be applied to correct for pulse-to-pulse frequency variations of several MHz nor to correct for rapid frequency chirping that occurs during each pulse. This is mainly due to the response time limitations of the PZT or other known method of laser frequency tuning which prevents the desired high speed frequency corrections. Because of this, the existing high intensity pulsed transmitters for Doppler Lidar applications have been made with a low-power stable frequency CW oscillator followed by a very bulky energetic multi-pass amplifier. Instead, because of its compactness it is naturally desirable to use the single mode TEA laser oscillator of the type mentioned above, if its pulse-to-pulse frequency fluctuations could be eliminated.

SUMMARY OF THE INVENTION

According to the invention a system for generating optical radiation at a desired stable frequency is provided comprising a power laser which produces optical radiation at a frequency $\omega$ that can fluctuate over a short interval, means responsive to this optical radiation for generating a modulation signal $\omega_m$ in the radio frequency range having frequency variations corresponding to the fluctuations of the laser frequency $\omega$ and having substantial amplitude, and a modulator for generating the desired stabilized optical radiation. The modulator has as inputs the fluctuating optical radiation of frequency $\omega$ and the radio frequency modulation signal $\omega_m$, while its output comprises an optical side band of the power laser radiation.

Preferably the means for generating the modulation signal $\omega_m$ includes a reference laser having an output of relatively low power and higher frequency stability than that of the power laser and a non-linear high speed mixing element arranged to mix radiation from the lasers to produce a difference voltage signal of frequency corresponding to the instantaneous difference in frequency of the outputs of the lasers. Preferably means are provided for generating the modulation signal $\omega_m$ of corresponding frequency and substantially higher amplitude than the difference signal. Preferably the modulation signal is produced by a broad band radio frequency amplifier. Where the power laser is of the type producing a pulsed output, the amplifier is of the pulsed type, timed to operate in synchronism with the pulsed laser.

A particularly novel system is obtained by use of a $CO_2$ TEA laser constructed to operate in single mode as the power laser and use of a relatively stable, relatively low power CW $CO_2$ laser as the reference laser.

In certain preferred embodiments an optical delay line is provided between the power laser and the modulator, adapted to introduce delay in the radiation $\omega$ to match its phase of arrival at the modulator with that of the modulation signal $\omega_m$.

The invention described makes it possible to utilize the output of a pulsed laser to generate a radiation beam of a comparable pulse intensity at a slightly shifted frequency $\omega_r$, with $\omega_r$ having a pulse-to-pulse frequency fluctuation considerably below that of the fluctuations of $\omega$.

The invention also provides a lidar system which incorporates the side band of the power laser as the probing radiation.

These and other features and advantages will be understood from the following description of a preferred embodiment, in conjunction with the drawings.

BRIEF DESCRIPTION OF DRAWINGS

FIG. 1 is a diagrammatic view of a laser system according to the invention;

FIGS. 2 and 3 are frequency diagrams illustrating the relative values and fluctuations of the frequencies present in the system;

and FIG. 4 is a diagrammatic view similar to FIG. 1 of the invention as applied to a TEA laser as the power laser.

Referring to FIG. 1 the output of the intense laser 10 is transmitted through a modulator crystal 12 such as CdS, arranged in a configuration where an rf voltage can be applied along lead 14 to the modulator crystal to cause modulation of the transmitted laser radiation at an rf modulating frequency, $\omega_m$. In this case, the modulated output radiation will have two side-bands at frequencies given by $\omega_+ = \omega + \omega_m$ and $\omega_- = \omega - \omega_m$. If $\omega_m$ were to be at a fixed frequency, the frequency fluctuations of $\omega$ would identically appear on $\omega_+$ and $\omega_-$. However in this embodiment the rf signal applied to the modulator crystal is generated as follows: a beam splitter 16 is provided at the output of the pulsed laser, preceding the modulator crystal. A small fraction of the pulsed laser radiation obtained from the beam splitter 16 is then mixed in high speed mixing element 18 with the CW output of a stable fixed-frequency low power $CO_2$ reference laser 20 oscillating at a frequency $\omega_r$ which is off-set (by standard means) from the line center at an rf frequency of, say, 20 MHz. The difference frequency signal voltage Vs ($\omega_m$) thus obtained across the frequency mixing element 18 is subsequently amplified in a broad-band amplifier 22 to produce Vo ($\omega_m$) and is then applied to the modulator crystal 12. Accordingly, the modulation frequency, $\omega_m$, will be $\omega_m = \omega - \omega_r$ if $\omega > \omega_r$, or $\omega_m = \omega_r - \omega$, if $\omega_r > \omega$. Consider, e.g. $\omega_r > \omega$. Note then that $\omega_+ = \omega + \omega_m = \omega + (\omega_r - \omega) = \omega_r$. In this example, the upshifted frequency $\omega_+$ for each pulse will be coincident with the stable reference laser frequency, $\omega_r$, even though the carrier laser frequency $\omega$ may have sizable pulse-to-pulse frequency fluctuations. (If $\omega_R < \omega$, then the downshifted side-band frequency $\omega_- = \omega - \omega_m$ will be coincident with the fixed-frequency reference laser, $\omega_r$).

For a variety of reasons, an intense pulsed laser of the type described is generally accompanied by a small frequency "chirping" in each laser pulse. Due to this frequency chirping effect, the presence of a phase-shift caused by the rf amplifier 22 along with the transit time of the radiation from the beam splitter 16 to the frequency mixing element 18 and the rf voltage propagation across the various connecting leads, a residual frequency shift can appear on the side-band frequency. If this phase shift is expressed as a delay-time, $\tau$, this residual frequency shift will be given by $(d\omega/dt) \tau$. Specifically, for $\omega_R > \omega$ the upshifted frequency will be given by: $\omega_+ = \omega_r + (d\omega/dt) \tau$. Since $d\omega/dt$ is not in general reproducible from pulse-to-pulse, this frequency chirp effect can hence cause a residual fluctuation at this side-band frequency, $\omega_+$.

In practice, a major contribution to $\tau$ will come from the broad-band amplifier. This contribution will be equal to the sum of the inverse of the bandwidths of the various amplification stages (plus the signal transit times across the leads). By use of a broad band rf amplifier having a band-width of several GHz, the total delay time due to this source can be kept, e.g., down to several nanosecond. Furthermore, it is possible to provide a variable compensating delay 30 via the transit time between the beam splitter and the modulator crystal, as by lenghtening the optical path length through use of mirrors. This allows an adjustment of the total phase shift, corresponding to a value of $\tau$ as short as several nanoseconds. If the laser frequency chirping is as much as several MHz per microsecond, then $(d\omega/dt)\tau$ will be as much as several KHz per microsecond, then $(d\omega/dt)\tau$ will be about ten KHz.

The reference frequency $\omega_r$ can be a laser at a microwave difference frequency removed from the laser frequency $\omega$ requiring stabilization. In this case, the modulating rf frequency $\omega_m$, can be generated by mixing $\omega_r$ and $\omega$ with a stable microwave frequency radiation $\omega_d$, so that $(\omega - \omega_r) - \omega_d$ lies at an rf frequency. This signal, once amplified, is then applied to the modulator crystal.

In pulsed operation, the rf amplifier can be also pulsed, to reduce the power consumption requirement. For such purpose, referring to FIG. 4, the amplifier 22 is preferably constructed as a hard tube modulator suitable for a pulse frequency of e.g. 10 or 100 per second, corresponding with the frequency of the power laser 10, in this case a $CO_2$ TEA laser operating in single mode. Synchronization of the intense pulsed $CO_2$ TEA laser and the amplifier operation is achieved through dependent timing circuit 32 while delay 30 adjusts phase of the inputs to modulator 12.

The invention in its broadest aspects also suggests that the frequency tuning of a side-band radiation by varying the modulation frequency can be advantageously used to achieve rapid frequency tuning for use in an automatic frequency control system. In this case, once an error voltage dependent on the laser frequency or a tuning control voltage is generated, by whatever means, this voltage can be used to tune the frequency of the modulating rf applied to the modulator crystal. The electronic circuits to implement this are well-known in the art of fm radio.

For the embodiment shown the high speed mixing element 18 may be a metal-metal oxide-metal (MOM) high speed junction or an InSb detector (of speed $\omega 1$ nsec), and the modulator, as previously mentioned, can be the well-known cadmium sulphide (cadmium selenide) crystal which has a high non-linear index and is capable of receiving the high levels of power contemplated herein.

The rf amplifier is preferably of very broad band to minimize the delay introduced by the amplifier and resultant mismatch of phase between the laser carrier frequency $\omega$ and the modulating frequency $\omega_m$. Preferably to keep the phase shift less than about 1 nanosecond, the amplifier should have a bandwidth of the order of 1000 MHz, despite the fact that there is only say a 20 or 100 MHz signal to be amplified. (The possibility of using the same system for tuning the final output by tuning $\omega_m$ therefore arises without change to the amplifier, etc.) If amplifiers of smaller band width are employed the importance of a variable delay means other than obtained by change of spacing of the components becomes of increasing importance. In the case of use of a variable delay device, the side band output can be observed by super heterodyne techniques and the variable delay can be adjusted to minimize any jitter observed in the output.

In certain cases the large amplitude (i.e. amplified) modulation signal can be obtained from the low power output of the high speed mixing element by a voltage controlled oscillator (VCO) with a phase locked loop, again also by using the variable delay 32 to deal with jitter, dependent upon the amount of frequency jitter that can be tolerated as determined by the particular application at hand.

The effect of the invention is to stabilize frequency variations occuring over *short* intervals, far beyond the capabilities of mechanical systems such as the typical PZT. On the other hand, even with the present invention, a PZT control can be useful for instance to compensate for longer term effects such as result from slow thermal fluctuations. Thus, as shown in FIG. 4, a PZT 50 is included in the TEA laser, driven by a DC voltage from discriminator 52 which receives the difference signal from the high speed mixer 18.

An extremely important use of the invention lies in the correction for laser chirping during each pulse as will be elaborated more fully below.

For most uses of the system of the invention, presence, with the desired stabilized optical side band, of the fluctuating carrier $\omega$ and the other, more severely fluctuating side band, can be ignored. For instance in a LIDAR application the transmitted pulses can contain these extra components, but they will be ignored by the detection system, e.g. a super heterodyne system specifically constructed to detect return of the stabilized side band. On the other hand, if these extra components are objectionable they can readily be removed, e.g. by a suitable Fabré-Perot filter.

While the single mode TEA laser is the preferred embodiment for certain LIDAR tasks, etc., the broad principles of the invention are applicable to other lasers, for instance excimer laser pulses can be smoothed in the same way.

The invention has considerable importance in respect of Q-switched lasers, including these with a saturable absorber inside the resonator and those employing a rotating mirror or internal eo (electro optic modulator) in a well known "cavity-dumping" configuration.

The invention is applicable to lasers in the ultraviolet as well as in the infrared and far infrared. Also the invention is applicable in certain instances to CW lasers, for instance the $CO_2$ and argon lasers.

In certain applications, for instance where the strength of the power laser is very great, the difference signal will have sufficient amplitude to be useful as the modulation signal without provision of an amplifier.

The following gives additional details of the generation of intense IR laser pulses at highly stable (and chirp-free) single frequency for Doppler wind velocity measurements.

GENERATION OF INTENSE $CO_2$ LASER PULSES AT A STABLE CHIRP-FREE SINGLE FREQUENCY

Frequency Stabilization by Transient Injection Locking

With transient injection locking (TIL), the laser energy from an intense gain-switched $CO_2$ pulsed plasma can be extracted at a single-mode frequency triggered by an injected (weak-field) radiation. With an internal low pressure $CO_2$ gain cell, the TIL laser oscillation occures on a single mode of the resonator lying near the center of a $CO_2$ amplifying transition. The identity of the laser field inside the resonator as an oscillating sinusoidal field is established after two or three transits across the length of the resonator (after the gain onset). Subsequent oscillation buildup in the single mode (near the line-center) will occur as in a free-running oscillator, without an interference from the (weak) injected field.

In the course of transient oscillation buildup, the oscillating laser frequency $\omega$ is subject to time variations caused by refractive index changes of the medium. It is known that by far the dominant source of refractive index change arises from shock waves due to the intense current-pulse producing the high density $CO_2$ laser plasma. Rapid deposition of energy in the medium causes the shock waves, which propagate at sound speed. However, the onset of violent refractive index changes due to this cause generally occurs at late times (because of propagation at sound speed) exceeding tens of $\mu sec$ after the current pulse. Accordingly, this effect can result in sizable chirping mainly at the tail of a long duration (several $\mu sec$) pulse. In practice, the magnitude of this chirping effect can be minimized by operating at a low plasms-current pulse; this, however, will be at the expense of a reduction in energy-deposition capacity and energy-conversion efficiency.

Another cause of frequency chirping is saturation of the amplifying transition. This effect occurs during a laser pulse if the resonator mode on which laser oscillation occurs is appreciably detuned from the transition center. This chirping effect is largest in the buildup portion (the leading edge) of the pulse. At line-center, however, there will be no contribution to chirping due to this source.

From the above it appears that the chirping will be at a minimum on linecenter and for a moderate laser excitation (sacrificing energy-conversion efficiency), particularly for pulse durations below several $\mu sec$. However, studies have revealed additional causes leading to small time dependent refractive index changes during the pulse and, hence, frequency chirping. The dominant process arises from a time dependent change in molecular composition of the medium taking place during each laser pulse. The intense current pulse produces sizable molecular decomposition. The resultant unstable constituents of the gas subsequently evolve (after each current pulse) toward the equilibrium gas mixture. In addition, the effect of redistribution of populations in the low-lying excited molecular states also contributes to a time-varying refractive index change during the laser pulse. Although the refractive index variations due to these causes are small, the resultant frequency chirping can be sizable.

Under the best conditions, the chirping rate on line-center (for a several hundred millijoule laser) can be reduced to a fraction of one MHz/$\mu$sec for pulses below one $\mu$sec duration. On the tail of the pulse, extensive heterodyne observations show that the chirp rate will build up to values larger than several MHz/$\mu$sec at times beyond five or ten $\mu$sec after the onset of the leading edge of the laser pulse. Using prior art techniques, it appears difficult to reduce the frequency chirping below this observed limiting value reported here. It is also to be noted that refractive index variations leading to frequency chirping will be larger in a higher energy laser.

Doppler wind velocity measurements (and other accurate Doppler Lidar applications) require a laser pulse of several $\mu$sec duration at a chirp rate below 100 kHz/$\mu$sec. The method and apparatus of the present invention offers the possibility of removing the residual frequency chirping from the laser output pulse.

An experimental arrangement for verifying these results employs heterodyne observations of TIL frequency characteristics. Two methods can be employed. The first relates to the studies of single-mode TIL operation near line-center obtained with an internal low pressure $CO_2$ gain cell. In this case, the single-frequency laser output is heterodyned against an external $CO_2$ laser local oscillator to observe the frequency characteristics. For a variety of reasons, it is advantageous to achieve single-mode TIL energy extraction employing an external CW $CO_2$ laser master oscillator for TIL driver. (In this case, the internal CW $CO_2$ gain cell is switched off). The advantages include the possibility of employing the CW TIL driver laser also as the local oscillator in heterodyne detection of the Lidar return signal.

If the external TIL driver laser is detuned from the peak of the resonator mode of the pulsed power oscillator, the TIL laser oscillation occurs at a frequency shifted to the peak of the resonator mode. In the extensive studies of frequency chirping and the related effects, the injected frequency, $\omega_{Inj}$, is detuned by a known amount from the peak of the power oscillator resonator mode. The TIL laser output is heterodyned against the same $CO_2$ laser employed as the TIL driver laser.

Detuning of the external TIL driver laser from the center frequency, $\omega_o$, of the power oscillator resonator mode is obtained as follows: With the intense pulsed plasma switched off, the internal CW $CO_2$ gain cell is employed to obtain CW laser oscillation at the center frequency $\omega_o$, of the power oscillator resonator mode. (With PZT tuning, the mode is centered on the internal low-pressure $CO_2$ gain profile.) With heterodyne observation, the TIL driver laser is detuned from $\omega_o$ by a preselected known amount. Rugged and stable resonator configurations are used to avoid appreciable long term drifts (as verified by frequent heterodyne observations in the course of an experiment). Once the known detuning is achieved, the internal $CO_2$ gain cell is switched off. The TIL energy extraction and heterodyne observations are then performed at the known detuned injected frequency.

It is necessary to decouple radiatively the power oscillator laser totally from LO (and external TIL driver). A ring resonator with appropriate suppressor-mirror (to avoid backward oscillation) and appropriate padding with attenuators are employed.

In accurate observation of frequency chirping, it is important to employ adequate optical isolation and electrical shielding of the high intensity plasma-current pulses (and the LO laser power supply); otherwise, the local oscillator will suffer (due to optical feedback or spurious electrical pickup currents) small frequency variations, rendering the measurements invalid. To verify the absence of such a spurious LO chirping, another LO is used to prove the frequency of the first LO during the short observation time (while the energy extraction from TIL power oscillator occurs).

It is essential to study frequency chirping effect (due to refractive index variation) at late times (about 5 to 10 $\mu$sec). After the onset of TIL laser pulse. The tail of the gain-switched pulse generally provides a weak, slowly decaying, laser output at such late times. Although the intensity on the tail is considerably below the main laser pulse, it can be readily detected with heterodyne detection and employed in the studies of frequency chirping. In oscilloscope traces of a photopreionized single-mode TIL laser output (at several hundred millijoule energy per pulse) heterodyned with a CW LO; the heterodyne beatnote (in the MHz range) appears superimposed on the pulse profile. The main pulse is below one $\mu$sec and has a long tail. When the oscilloscope is triggered at about five $\mu$sec after the main pulse, an initial zero beat and a subsequent increase in beatnote is seen. At about 10 to 11 $\mu$sec after the pulse, the chirp rate has increased to a value of about 3 MHz/$\mu$sec. This displays the limiting chirp rate obtainable in a typical several hundred millijoule photopreionized TIL $CO_2$ laser. As noted, lasers at higher pulse energies will suffer larger chirp rates. At early times after the onset of the laser pulse, however, the chirp rate can be considerably below the value stated here. This can be obtained by carefully centering the power oscillator resonator mode near the line-center and at a somewhat reduced energy deposition efficiency and uniform excitation across the cross section of a (seed gas) photopreionized $CO_2$ laser. For a one $\mu$sec pulse, the chirp rate can be as low as a fraction of one MHz/$\mu$sec.

REMOVAL OF RESIDUAL FREQUENCY CHIRPING FROM OUTPUT LASER PULSE

Method And Apparatus of The Invention

The chirp removal method and apparatus according to the invention employs electro-optic modulation of the laser output at an rf frequency. The modulating rf voltage is obtained from a laser beatnote produced by mixing a small fraction of the intense laser pulse with the output of a stable CW laser. In one embodiment, the stable CW laser frequency (or the frequency of the high-energy pulsed laser) is tuned so that the beatnote appears at a convenient rf range. (This heterodyning is accomplished at large input radiation signals incident on the mixer element, hence the beat voltage across the mixer appears at a sizable signal level). The resultant beatnote, after amplification in a broadband rf amplifier (when necessary), is applied to an electro-optical modulator to produce frequency modulation of the output laser pulse. Inspection will show that one of the rf sidebands will be free from laser chirp. A variable optical delay is provided to make up for small delays in the rf amplifier circuit. It can be shown that if this delay is not totally corrected, the chirping effect, although reduced by orders of magnitude, will not be totally eliminated; the remaining chirp will be $(d\omega/dt)\tau$, where $(d\omega/dt)$ is the chirp rate at the output of the pulsed laser and $\tau$ is the delay time. (In practice, $\tau$ can be reduced to values below several nsec.)

In an ultimate design it is possible to employ single sideband e.o. modulation, converting more than 50 percent of a (e.g., ten joule) laser output pulse to a nearly chirp-free sideband. Depending on the laser intensity, it is also possible to use the e.o. modulator in the form of a thin (e.g. waveguide type) sample to achieve high conversion efficiency at reduced modulator rf voltages.

Other applications require a pulsed chirp-free master-oscillator unit at a reasonably large output power level; the master-oscillator unit can then be used in a MOPA (Master Oscillator Power Amplifier) configuration to extract a chirp-free amplified output from a high energy power amplifier. If the master oscillator provides a reasonably large output power, the requirements for multipass power amplification will be enormously relaxed. (In the existing MOPA systems, multipass amplification with intricate isolation stages are needed because of low-level power outputs of the existing stable master oscillators. This is the main reason for complexities of the existing high energy MOPA systems.) A longitudinally excited low pressure Q-switched $CO_2$ laser, for example, can be used in the chirp-removal system suggested here. Such a Q-switched $CO_2$ laser, after chirp removal, can be used as a master oscillator at a relatively high peak intensity in a MOPA system.

This method and apparatus has important application in generation of chirp-free radiation for accurate Doppler Lidar.

What is claimed is:

1. A system for generating optical radiation employing a power laser that produces optical radiation at a frequency, $\omega$, that can fluctuate over a short interval characterized by apparatus for producing from said radiation at frequency $\omega$ radiation of more stable frequency, said apparatus comprising
  (a) modulation signal generating means responsive to said optical radiation from said power laser, said modulation signal generating means including
    i. a reference source for optical radiation having relatively lower power and higher frequency-stability than that of said power laser,
    ii. a non-linear mixing element arranged to mix inputs of radiation from said power laser and said reference source, said mixing element characterized by a high speed of response sufficient to produce a difference signal at a frequency, $\omega_m$, corresponding to the instantaneous differences in frequency of said inputs
  (b) and an electro-optical modulator for generating the desired stable optical radiation,
    i. said modulator having as inputs said fluctuating optical radiation of frequency $\omega$ from said power laser and said modulation signal of frequency $\omega_m$,
    ii. and said modulator having as an output an optical sideband of said power laser frequency $\omega$ that is free of fluctuations that are present in said power laser frequency $\omega$.

2. The system of claim 1 further characterized by means for generating from said difference signal the modulation signal of said frequency $\omega_m$ at an amplitude substantially higher than that of said difference signal.

3. The system of claim 2 characterized in that said means for generating said modulation signal from said difference signal comprises a broad band radio frequency amplifier.

4. The system of claim 3 wherein said power laser is of the type producing a pulsed output, said radio frequency amplifier being of the pulsed type timed to operate in synchronism with said pulsed laser.

5. The system of claim 1 characterized in that said reference source comprises a reference laser having an output of relatively lower power and of higher frequency stability than that of said power laser.

6. The system of claim 1 wherein said power laser is a $CO_2$ TEA laser constructed to operate in a single mode.

7. The system of claim 6 wherein said reference laser is a relatively stable, relatively low power CW $CO_2$ laser.

8. The system of claim 1 further characterized by an optical delay means between said power laser and said modulator, said delay means adapted to introduce time delay in the power laser radiation to match timing with said modulation signal.

9. A Lidar system characterized by incorporation said side band of said power laser of claim 1 as the probing radiation.

* * * * *